US012682545B2

(12) United States Patent
Lee et al.

(10) Patent No.: US 12,682,545 B2
(45) Date of Patent: Jul. 14, 2026

(54) RENDERING A VISUAL REPRESENTATION OF A LUMINAIRE BY RE-USING LIGHT VALUES

(71) Applicant: SIGNIFY HOLDING B.V., Eindhoven (NL)

(72) Inventors: Wei Pien Lee, Eindhoven (NL); Chris Damkat, Eindhoven (NL); Sander Meesen, Eindhoven (NL); Hendrikus Hubertus Petrus Gommans, Meeuwen (NL); Mohamed Yehia Mohamed Elsayed, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 252 days.

(21) Appl. No.: 18/572,328

(22) PCT Filed: Jun. 20, 2022

(86) PCT No.: PCT/EP2022/066718
§ 371 (c)(1),
(2) Date: Dec. 20, 2023

(87) PCT Pub. No.: WO2022/268711
PCT Pub. Date: Dec. 29, 2022

(65) Prior Publication Data
US 2024/0338882 A1 Oct. 10, 2024

(30) Foreign Application Priority Data

Jun. 25, 2021 (EP) ..................................... 21181623

(51) Int. Cl.
*G06T 15/04* (2011.01)
*G06T 15/50* (2011.01)

(52) U.S. Cl.
CPC ............ *G06T 15/04* (2013.01); *G06T 15/506* (2013.01)

(58) Field of Classification Search
None
See application file for complete search history.

(56) References Cited

U.S. PATENT DOCUMENTS

2018/0195684 A1* 7/2018 Vissenberg ............. F21V 13/10
2020/0020155 A1 1/2020 Duka et al.
(Continued)

FOREIGN PATENT DOCUMENTS

WO 2018041821 A1 3/2018
WO 2022268718 A1 12/2022

OTHER PUBLICATIONS

"Real Time Rendering and Unreal Engine 4," An Overview of the Real-Time Rendering Pipeline in Unreal Engine 4, Published in Unreal Engine, Apr. 2020, Zuro Tecj, URL: https://zuro.tech/blog/real-time-rendering-and-unreal-engine-4, Last Retrieved Dec. 19, 2023 (26 Pages).
(Continued)

*Primary Examiner* — Nurun Flora

(57) ABSTRACT

A method of displaying a visual representation of a luminaire comprises obtaining a three-dimensional model of the luminaire and one or more texture maps associated with the three-dimensional model, determining a camera location and orientation based on user input, and determining observation angles on each of a plurality of surface positions of the three-dimensional model based on the camera location and orientation. The visual representation includes a representation of a light effect generated by one or more activated light sources in or on the luminaire, the one or more light sources and the luminaire are rotatably symmetric with respect to a central axis of the luminaire, and the surface of the luminaire comprises a plurality of repeating sections.
(Continued)

t1

31

33 t1

31

35

The method further comprises determining, for each of the plurality of surface positions, an applicable light value for a respective surface position based on the observation angle determined for the surface position and a light value predetermined either for the surface position or for a corresponding surface position of a different section of the luminaire, and rendering the visual representation of the luminaire based on the three-dimensional model, the one or more texture maps, the applicable light values, and the camera location and orientation. At least some of the applicable light values are determined based on light values predetermined for corresponding surface positions of a different section of the luminaire.

15 Claims, 5 Drawing Sheets

(56) References Cited

U.S. PATENT DOCUMENTS

| | | |
|---|---|---|
| 2020/0265639 A1 | 8/2020 | Fursund et al. |
| 2022/0189101 A1* | 6/2022 | Ulichney ......... G06K 19/06028 |
| 2022/0260967 A1* | 8/2022 | Moroney ............... G06T 17/00 |
| 2024/0203029 A1* | 6/2024 | Gommans ............. B33Y 80/00 |

OTHER PUBLICATIONS

Levoy, Marc, "Light Field Rendering," Computer Graphics Proceedings, SIGGRAPH 1996, ACM, New York, Aug. 1996 (12 Pages).

* cited by examiner

101 ⌇ obtain 3d model

103 ⌇ determine camera angle

104 ⌇ select surface position

105 ⌇ determine observation angle

107 ⌇ determine light value

108 ⌇ more surface positions? — yes no

109 ⌇ render luminaire representation

111 ⌇ display luminaire representation

RENDERING A VISUAL REPRESENTATION OF A LUMINAIRE BY RE-USING LIGHT VALUES

CROSS-REFERENCE TO PRIOR APPLICATIONS

This application is the U.S. National Phase application under 35 U.S.C. § 371 of International Application No. PCT/EP2022/066718, filed on Jun. 20, 2022, which claims the benefit of European Patent application Ser. No. 21/181, 623.6, filed on Jun. 25, 2021. These applications are hereby incorporated by reference herein.

FIELD OF THE INVENTION

The invention relates to a system for displaying a visual representation of a luminaire, said visual representation including a representation of a light effect generated by one or more activated light sources in or on said luminaire.

The invention further relates to a method of displaying a visual representation of a luminaire, said visual representation including a representation of a light effect generated by one or more activated light sources in or on said luminaire.

The invention also relates to a computer program product enabling a computer system to perform such a method.

BACKGROUND OF THE INVENTION

In the past years, customization of products seems to be a trend and simultaneously, 3D printing is becoming a widely spread technology to produce products. Signify has combined both trends and now does not only use Fused Filament Fabrication (FFF) 3D printing technologies for mass production, but also allows customized luminaire designs to be printed.

Someone that uploads a printable design would preferably like to see what the printed luminaire is going to look like and even more preferably be able to adapt the camera location and/or orientation. The latter normally requires real-time rendering of light effects (often called "shading") such that every new point of view due to user interaction can be recalculated 'instantly'. Real-time rendering techniques have come a long way, but still need to limit quality to be able to run on a wide variety of hardware. This compromise usually results in light effects that are less realistic than what users are used to in the real world, especially in case of refractions (and complex specular reflections) of light.

This may occur, for example, when a luminaire is going to be manufactured from a transparent material that refracts light (and reflects light due internal reflections). Light rays originating from a light source change direction multiple times, by interacting with the material surfaces, before they reach the camera. In this case, the apparent surface color (i.e., including intensity) is dependent on both the position of the light source and the camera location and orientation. For example, the side of a luminaire may become brighter when it is viewed from a lower camera position. Representing this visually is a calculation intensive process.

A widely used technique for rendering visual representations of three-dimensional models is to capture luminance of the surface in a light map which is calculated beforehand so that enough resources can be allocated to do so. In such a setup, all the effects, including reflection, diffusion, refraction, self-illumination etc., may be considered. As mentioned above, (real-time) rendering realistic light effects requires computational power that is not available on most devices.

However, rendering realistic light effects is very important for the realistic and attractive presentation of a luminaire, as it is sometimes hard to imagine what the luminaire will look like, especially with an activated light source (e.g., at night). Since a user typically wants to view the product from multiple angles, a real-time solution for natural interaction is required. Changing the location and/or orientation while using a static lightmap does not change the appearance in the way the user would expect. Due to the texture mapping with light maps, the local color, or 'apparent luminance', is rather 'sticking' to the surface while the camera location and/or orientation changes. This creates the false impression that the position of the light source changes.

SUMMARY OF THE INVENTION

It is a first object of the invention to provide a system, which can render and display a realistic visual representation of a luminaire with an activated light source in real-time.

It is a second object of the invention to provide a method, which can be used to render and display a realistic visual representation of a luminaire with an activated light source in real-time.

In a first aspect of the invention, a system for displaying a visual representation of a luminaire, said visual representation including a representation of a light effect generated by one or more activated light sources in or on said luminaire, comprises at least one output interface and at least one processor configured to obtain a three-dimensional model of said luminaire and one or more texture maps associated with said three-dimensional model, said one or more light sources and said luminaire being rotatably symmetric with respect to a central axis of said luminaire, said surface of said luminaire comprising a plurality of repeating sections, determine a camera location and orientation based on user input, and determine observation angles on each of a plurality of surface positions of said three-dimensional model based on said camera location and orientation.

Said at least one processor is further configured to determine, for each of said plurality of surface positions, an applicable light value for a respective surface position based on said observation angle determined for said surface position and a light value predetermined either for said surface position or for a corresponding surface position of a different section of said luminaire, at least some of said applicable light values being determined based on light values predetermined for corresponding surface positions of a different section of said luminaire, render said visual representation of said luminaire based on said three-dimensional model, said one or more texture maps, said applicable light values, and said camera location and orientation, and display said visual representation via said at least one output interface.

A static lightmap is often used when the camera location and orientation is static or when realistic lighting is not important. Instead of using a static lightmap that does not regard the observation angle, i.e., the angle at which a surface position in the light map is observed from the camera, it is possible to store multiple light values for each surface position in order to take into account the light value, e.g., luminance or color, at the different observation angles, e.g., by storing one light value per observation angle. This makes it possible to render and display a realistic visual representation of the luminaire.

However, storing many values for each surface position would lead to a very large dataset. Since many luminaires are rotatably symmetric with respect to a central axis, have one or more light sources which are rotatably symmetric with respect to the central axis of the luminaire, and have a surface which comprises a plurality of repeating sections, it becomes possible to reduce the quantity of light values that need to be stored, as light values only need to be stored for one section of the surface of the luminaire model in this case. This makes real-time rendering feasible, as it ensures that the model (download) size is not large and results in faster loading and hence a better experience.

The visual representation may be of a luminaire to be manufactured using an additive manufacturing process. The additive manufacturing process may comprise 3D printing, for example. The angle at which a surface position is observed normally depends on the camera location and orientation and the orientation of the luminaire. The user may or may not be able to change the orientation of the luminaire, e.g., to rotate the luminaire.

The one or more light sources and the luminaire do not need to be perfectly rotatably symmetric with respect to the central axis of the luminaire. Some deviation from perfect symmetry may be allowed while still providing a plausible light effect. The rotational symmetry may be a 'folded' symmetry, for example. The term "rotational symmetry" is not meant to be limited to cylindrical symmetry but also includes lower symmetries such as for instance sixfold symmetry. The rotational symmetry of the one or more light sources may be out of phase compared to the rotational symmetry of the one or more light sources. For example, the light sources may be located on boundaries between repeating sections.

The one or more light sources may be located on the symmetry axis, but this is not required. The number of light sources not located on the symmetry axis should be equal or an integer multiple of the number of repeating sections. If the luminaire has multiple light sources, all light sources may be in the luminaire, all light sources may be on the luminaire (e.g., on a chandelier), or one or more light sources may be in the luminaire and one or more light sources may be on the luminaire.

The one or more light sources are preferably modelled as point light sources in the rendering context. These point light sources affect the appearance of the luminaire surface. A geometrical/visual representation of the bulb or light emitting surface of the actual physical light source is preferably shown as well. This representation may be combined with the visual representation of the luminaire, for example. In this case, this representation of the bulb or light emitting surface may appear bright in the rendering due to self-illuminance but does not affect the environment.

Said at least one processor may be configured to pre-render said predetermined light values by rendering a light value for each of a plurality of observation angles for each surface position in said three-dimensional model, preferably of one section of said luminaire. Not only light from the one or more light sources in or on the luminaire may be considered but also light from other (virtual) light sources in the environment, e.g., studio lights or daylight.

Said at least one processor may be configured to determine a first observation angle on a first one of said plurality of surface positions, determine at least two observation angles surrounding said first observation angle, determine at least two relevant light values based on said at least two observation angles and light values predetermined either for said first surface position or for a corresponding surface position of a different section of said luminaire, and determine a first applicable light value for said first surface position by interpolating between said at least two relevant light values. This interpolation further reduces the quantity of light values that need to be stored.

Said at least one processor may be configured to store said predetermined light values in angle-dependent light maps and determine said applicable light values based on said angle-dependent light maps. Alternatively, said at least one processor may be configured to train a machine learning model based on said predetermined light values and determine said applicable light values via said machine learning model. The latter may further reduce the amount of data required to render a light value for each surface position from a certain observation angle.

Said at least one processor may be configured to determine a material for printing said luminaire and pre-render said predetermined light values in dependence on said material. The way light rays interact with the material from which the luminaire will be manufactured typically depends on the material used and this material is therefore preferably taken into account to create a realistic visual representation.

Said at least one processor may be configured to pre-render said predetermined light values based on said one or more texture maps and/or based on a computer-aided design file. The one or more texture maps and/or the CAD file may be used to determine the reflection and refraction of the light, for example.

Said at least one processor may be configured to determine one or more positions of said one or more light sources and pre-render said predetermined light values in dependence on said one or more positions. This makes it possible to create a realistic visual representation if the luminaire comprises multiple light sources or comprises a single light source which is not located in the center of the central axis.

Said at least one processor may be configured to determine one or more applicable light maps which include said applicable light values, and render said visual representation of said luminaire by rendering said visual representation of said luminaire based on said one or more applicable light maps and thereby based on said applicable light values. By creating one or more conventional light maps, e.g., from angle-dependent light maps, it may be possible to re-use existing rendering software and/or hardware.

Said at least one processor may be configured to determine a further camera location and orientation based on further user input, determine further observation angles on each of said plurality of surface positions of said three-dimensional model based on said further camera location and orientation, determine, for each of said plurality of surface positions, a further applicable light value for a respective surface position based on said further observation angle determined for said surface position and a light value predetermined either for said surface position or for a corresponding surface position of a different section of said luminaire, at least some of said further applicable light values being determined based on light values predetermined for corresponding surface positions of a different section of said luminaire, render said further visual representation of said luminaire based on said three-dimensional model, said one or more texture maps, said further applicable light values, and said further camera location and orientation, and display said further visual representation via said at least one output interface. This allows the user to interact with the displayed visual representation, e.g., to see what the luminaire to be printed is going to look like from different angles and optionally see the impact of changes in user-specified parameters.

Said three-dimensional model may be a three-dimensional mesh model or a boundary representation, for example. Alternatively or additionally, said at least one processor may be configured to receive a digital three-dimensional design model of said luminaire and obtain said three-dimensional model and said one or more texture maps by creating said three-dimensional model and said one or more texture maps based on said digital three-dimensional.

Said at least one processor may be configured to determine user-specified printing parameters for printing said luminaire and render said visual representation of said printed luminaire further based on said user-specified printing parameters. For example, user-specified parameters may indicate the print layer height and/or width and/or from which material the luminaire will be manufactured.

In a second aspect of the invention, a method of displaying a visual representation of a luminaire, said visual representation including a representation of a light effect generated by one or more activated light sources in or on said luminaire, comprises obtaining a three-dimensional model of said luminaire and one or more texture maps associated with said three-dimensional model, said one or more light sources and said luminaire being rotatably symmetric with respect to a central axis of said luminaire, said surface of said luminaire comprising a plurality of repeating sections, determining a camera location and orientation based on user input, and determining observation angles on each of a plurality of surface positions of said three-dimensional model based on said camera location and orientation.

The method further comprises determining, for each of said plurality of surface positions, an applicable light value for a respective surface position based on said observation angle determined for said surface position and a light value predetermined either for said surface position or for a corresponding surface position of a different section of said luminaire, at least some of said applicable light values being determined based on light values predetermined for corresponding surface positions of a different section of said luminaire, rendering said visual representation of said luminaire based on said three-dimensional model, said one or more texture maps, said applicable light values, and said camera location and orientation, and displaying said visual representation. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for displaying a visual representation of a luminaire, said visual representation including a representation of a light effect generated by one or more activated light sources in or on said luminaire.

The executable operations comprise obtaining a three-dimensional model of said luminaire and one or more texture maps associated with said three-dimensional model, said one or more light sources and said luminaire being rotatably symmetric with respect to a central axis of said luminaire, said surface of said luminaire comprising a plurality of repeating sections, determining a camera location and orientation based on user input, and determining observation angles on each of a plurality of surface positions of said three-dimensional model based on said camera location and orientation.

The executable operations further comprise determining, for each of said plurality of surface positions, an applicable light value for a respective surface position based on said observation angle determined for said surface position and a light value predetermined either for said surface position or for a corresponding surface position of a different section of said luminaire, at least some of said applicable light values being determined based on light values predetermined for corresponding surface positions of a different section of said luminaire, rendering said visual representation of said luminaire based on said three-dimensional model, said one or more texture maps, said applicable light values, and said camera location and orientation, and displaying said visual representation.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figures 1, 2:
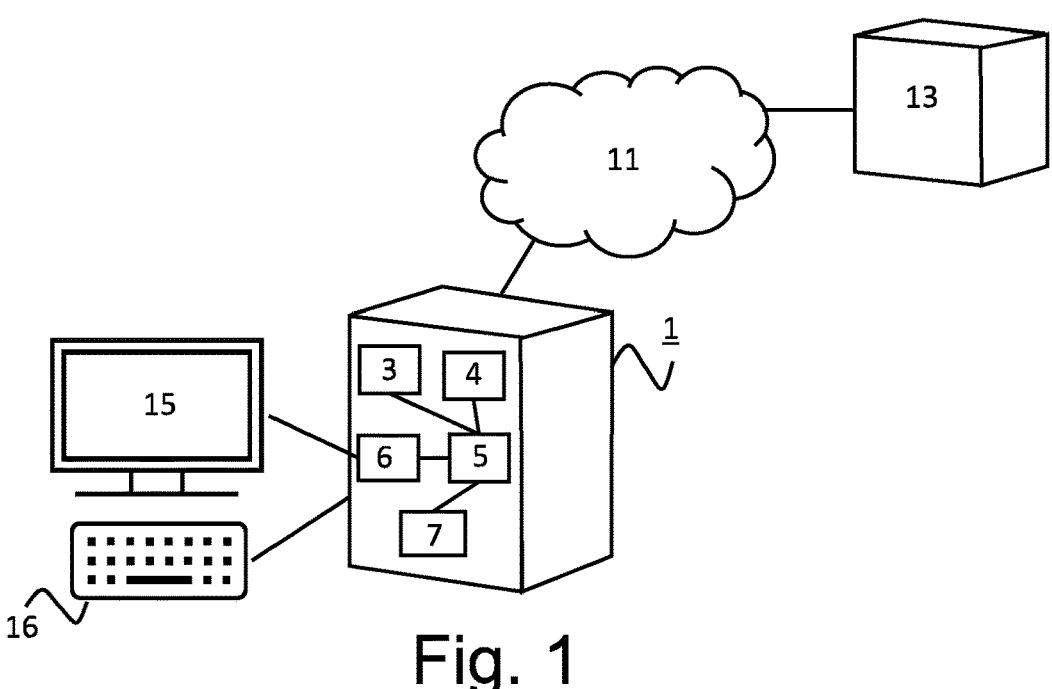
FIG. 1 is a block diagram of an embodiment of the system.
FIG. 2 is a flow diagram of a first embodiment of the method.

FIG. 1 shows an embodiment of the system for displaying a visual representation of a luminaire, e.g., of a luminaire to be manufactured using an additive manufacturing process. The visual representation includes a representation of a light effect generated by one or more activated light sources in or on the luminaire. In this first embodiment, the system is a computer 1. The computer 1 is connected to the Internet 11. A display device 15 is connected to the computer 1. The computer 1 may be a desktop computer or laptop computer, for example. Alternatively, the system may be a tablet or mobile phone, for example.

The computer 1 comprises a receiver 3, a transmitter 4, a processor 5, a display interface 6, and storage means 7. The processor 5 is configured to obtain a three-dimensional model of the luminaire and one or more texture maps associated with the three-dimensional model. The one or more light sources and the luminaire are rotatably symmetric with respect to a central axis of the luminaire and the surface of the luminaire comprises a plurality of repeating sections.

The processor 5 is further configured to determine a camera location and orientation based on user input, determine observation angles on each of a plurality of surface positions of the three-dimensional model based on the camera location and orientation, and determine, for each of the plurality of surface positions, an applicable light value for a respective surface position based on the observation angle determined for the surface position and a light value predetermined either for the surface position or for a corresponding surface position of a different section of the luminaire. At least some of the applicable light values are determined based on light values predetermined for corresponding surface positions of a different section of the luminaire.

Determining the observation angles on each of the plurality of surface positions may comprise selecting a surface position, determining the surface orientation for this surface position, and determining the observation angle for this surface position relative to the surface orientation. In this case, the observation angles are relative to the surface orientation and the surface position. Alternatively, the observation angles may be relative to the 3D model's local coordinate system. The observation angles may be determined for each surface position of a repeating section, for example.

The processor 5 is further configured to render the visual representation of the luminaire based on the three-dimensional model, the one or more texture maps, the applicable light values, and the camera location and orientation, and display the visual representation on the display device 15 via the display interface 6. The user input may be received via a keyboard 16, a microphone (not shown) or via display device 15 if it has a touchscreen, for example.

The three-dimensional model may be obtained from an Internet server 13, for example. The Internet server 13 is also connected to the Internet 11. In the embodiment of FIG. 1, the rendering is executed by the processor 5, e.g., a CPU. In an alternative embodiment, the rendering is at least part executed by a GPU. In the embodiment of FIG. 1, the computer 1 is a local computer located near the display device 15. In an alternative embodiment, the computer 1 is a cloud computer which displays the visual representation via a local device, e.g., via a local computer, which is connected to the display device or comprises a display itself.

In the embodiment of the computer 1 shown in FIG. 1, the computer 1 comprises one processor 5. In an alternative embodiment, the computer 1 comprises multiple processors. The processor 5 of the computer 1 may be a general-purpose processor, e.g., from Intel or AMD, or an application-specific processor. The processor 5 of the computer 1 may run a Windows or Unix-based operating system for example. The storage means 7 may comprise one or more memory units. The storage means 7 may comprise one or more hard disks and/or solid-state memory, for example. The storage means 7 may be used to store an operating system, applications and application data, for example.

The receiver 3 and the transmitter 4 may use one or more wired and/or wireless communication technologies such as Ethernet and/or Wi-Fi (IEEE 802.11) to connect to the Internet 11, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The computer 1 may comprise other components typical for a computer such as a power connector. The invention may be implemented using a computer program running on one or more processors.

A first embodiment of displaying a visual representation of a luminaire is shown in FIG. 2. The visual representation includes a representation of a light effect generated by one or more activated light sources in or on the luminaire. The method may be performed by the computer 1 of FIG. 1, for example.

Figures 3, 4, 5:
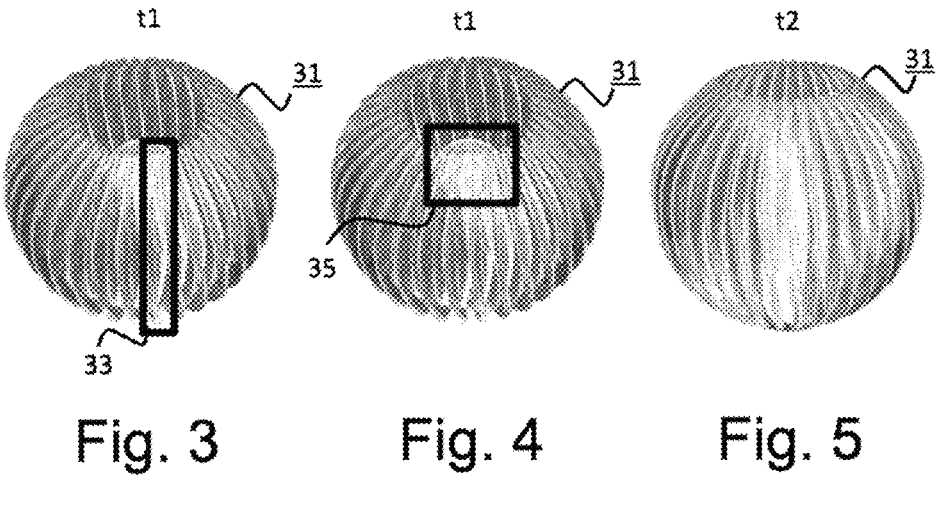
FIG. 3 highlights a repeating section in an example of a visual representation of a luminaire shown at a first moment.
FIG. 4 highlights the light source in the visual representation of FIG. 3.
FIG. 5 is a second example of a visual representation of the luminaire of FIG. 3, now shown at a second moment after a change in camera location and orientation.

A step 101 comprises obtaining a three-dimensional model of a luminaire and one or more texture maps associated with the three-dimensional model. The three-dimensional model may be a three-dimensional mesh model or a boundary representation, for example. The one or more light sources and the luminaire are rotatably symmetric with respect to a central axis of the luminaire and the surface of the luminaire comprises a plurality of repeating sections. FIGS. 3 and 4 show an example of a visual representation of a luminaire 31 from a first camera location and a first camera orientation at time t1. In FIG. 3, the repeating section 33 has been highlighted. In FIG. 4, the light source 35 has been highlighted.

A step 103 comprises determining a camera location and orientation based on user input. Next, in the first iteration of a step 104, a first surface position is selected from a plurality of surface positions of the three-dimensional model, which has been obtained in step 101. A step 105 comprises determining an observation angle on the surface position selected in step 104 based on the camera location and orientation determined in step 103. Determining the observation angle may comprise determining the surface orientation for the surface position selected in step 104 and determining the observation angle for this surface position relative to the surface orientation. The observation angle on a certain surface position typically depends on both the determined camera location and orientation and on the orientation of the luminaire. The user may or may not be able to change the orientation of the represented luminaire, e.g., rotate the represented luminaire.

A step 107 comprises determining an applicable light value for the surface position selected in step 104 based on the observation angle determined for this surface position in step 105 and a light value predetermined either for this surface position or for a corresponding surface position of a different section of the luminaire.

In a step 108, it is determined whether at least one of the surface positions has not been selected yet in step 104. If so, step 104 is repeated, and a next surface position is selected. As a result, observation angles are determined on each of the plurality of surface positions and step 107 is performed for each of the plurality of surface positions for which an observation angle was determined in step 105. At least some of the applicable light values determined in step 107 are determined based on light values predetermined for corresponding surface positions of a different section of the luminaire.

A step 109 comprises rendering the visual representation of the luminaire based on the three-dimensional model obtained in step 101, the one or more texture maps obtained in step 101, the applicable light values determined in step 107, and the camera location and orientation determined in step 103 (and optionally, the rotation of the luminaire). The one or more texture maps may include a logo to be applied to the luminaire and/or print relief details and/or modulation patterns. These print relief details and/or modulation patterns may be determined from a print track model, for example. A step 111 comprises displaying the visual representation rendered in step 109.

Figure 6:
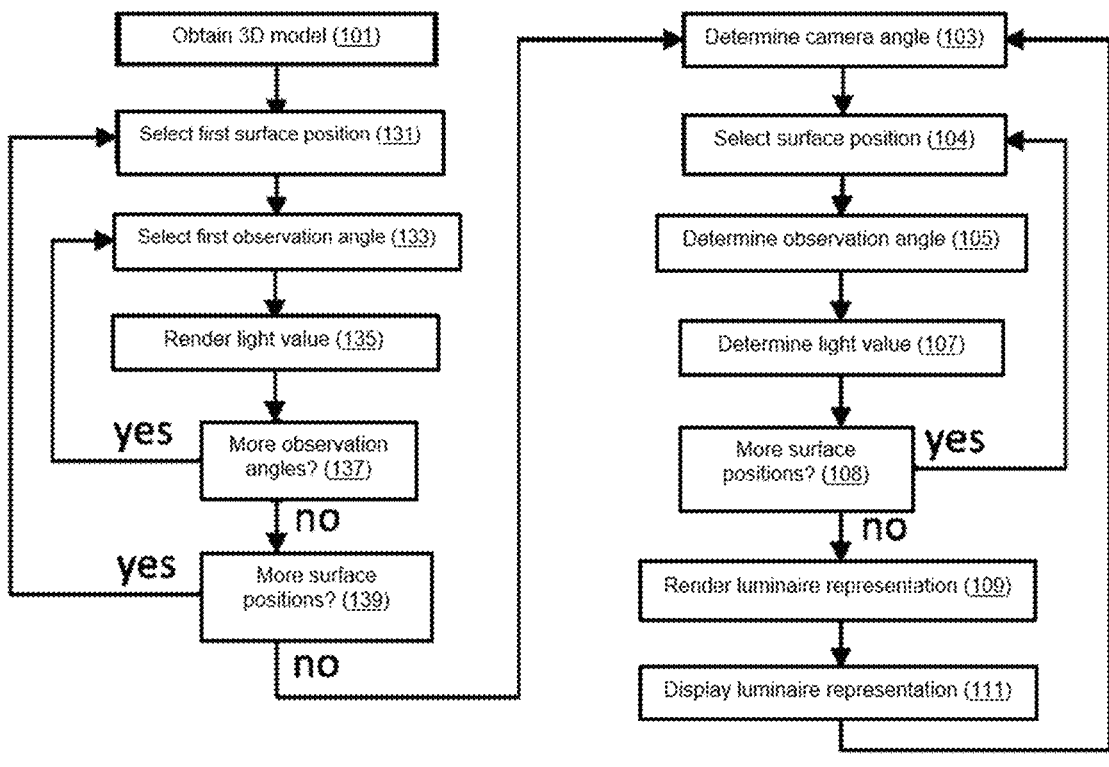
FIG. 6 is a flow diagram of a second embodiment of the method.

A second embodiment of displaying a visual representation of a luminaire is shown in FIG. 6. This second embodiment is an extension of the first embodiment of FIG. 2. In the embodiment of FIG. 6, steps 131, 133, 135, 137, and 139 are performed between steps 101 and 103 of FIG. 2 and step 103 is repeated after step 111.

In steps 131-139, the predetermined light values used in step 107 are pre-rendered by rendering a light value for each of a plurality of observation angles for each surface position in the three-dimensional model of at least one section of the luminaire. In the first iteration of step 131, a first surface position of one of the repeating sections of the three-dimensional model obtained in step 101 is selected. Next, in the first iteration of step 133, a first observation angle of the observation angles is selected.

The observation angle may be expressed as a single three-dimensional vector or as a combination of a horizontal angle and a vertical angle, for example. The observation angles may be relative to the surface position and relative to a surface orientation at this surface position, for example. When the material of the luminaire is opaque, the observation angle may be selected from fewer observation angles than when the material of the luminaire is semi-transparent. At this stage, the observation angles are independent of any orientation of the luminaire or of any camera location and orientation. Step 135 comprises rendering a light value for the observation angle last determined in step 133 for the surface position last selected in step 131.

Step 135 may comprise obtaining a local luminance distribution over observation angles for positions on the surface using a customizable high-end rendering pipeline. Since step 135 is the computationally intensive step, it has been included in the pre-rendering stage, i.e., it is executed 'off-line'. This makes it possible to use all required resources and be physically accurate with raytracing and material models in order to obtain a high-quality dataset to start with.

The local luminance distribution obtained for a certain observation angle at a certain surface position preferably depends on the surface orientation at this surface position. This make it possible, for example, to determine the lambertion distribution and thereby realistically render the light effect. The local luminance distribution may be determined per light source and then combined. The following three factors may be taken into account to determine the local luminance distribution:

Light position and its emission properties (e.g., a homogenous distribution for a point source);

Surface position and orientation and is reflection/diffraction properties;

Camera and its intrinsic and extrinsic values (the latter including the observation angle).

In step 137, it is determined whether there is at least one observation angle which has not been selected yet for the surface position last selected in step 131. If so, step 133 is repeated, and a next observation angle is selected. Otherwise, a step 139 is performed. In step 139, it is determined whether there is at least one surface position of the repeating section which has not been selected yet in step 133. If so, step 131 is repeated, and a next surface position of the repeating section is selected, after which the first observation angle is selected for this next surface position in step 133. Otherwise, step 103 is performed.

In the embodiment of FIG. 6, light values are rendered for one of the repeating sections of the luminaire. Since the one or more light sources and the luminaire are rotatably symmetric with respect to a central axis of the luminaire and the surface of the luminaire comprises a plurality of repeating sections, these light values can then be used for all repeating sections of the luminaire in step 107.

Step 135 may comprise storing the predetermined light values in angle-dependent light maps. In that case, step 107 comprises determining the applicable light values based on the angle-dependent light maps stored in step 135. As previously discussed, the surface of the luminaire can appear quite differently depending on the camera location and orientation. This light effect may be approximated with an (observation) angle dependent light map, which may be used in combination with the applicable observation angle to obtain the correct luminance or color. As a result, the applicable light values representing luminance or color on the surface of the object at a certain location will change when the camera location and/or orientation changes (or the orientation of the luminaire changes), because the applicable observation angles change as well.

If light values would be stored for each surface position of the three-dimensional model and the light maps would need to store values for many observation angles for every location on the surface, this would be quite data intensive. A map storing the luminance or color for 2048×2048 locations and 16 horizontal and 16 vertical angles would require storage of over 1 million values. Resolution could be reduced, and interpolation could be used, to create intermediate values, but the given example is already at the lower end of the resolution required for a realistic rendering.

However, since many luminaires are rotatably symmetric with respect to a central axis, have one or more light sources which are rotatably symmetric with respect to the central axis of the luminaire, and have a surface which comprises a plurality of repeating sections, it is not necessary to store unique light map values for every position on the surface, but only for a single repeating section, e.g., a vertical slice of the cylindrical structure. These values can then be re-used for the other sections, e.g., by having the correct UV parameterization of the surface in which coordinates repeat for the repeating sections of the surface.

Alternatively, step 135 may comprise training a machine learning model based on the predetermined light values. In that case, step 107 may comprise determining the applicable light values via the machine learning model trained in step 135. For example, instead of using light maps to reduce the data required to render an applicable light value, e.g., a color or luminance value, for a certain surface position from a certain observation angle, a function that will map these input parameters to the desired light value may be used. This is also referred to as a "compressed light map" in this description.

This machine learning model may be in the form a neural network or a non-linear regression model. A neural network may be created that has as inputs the position (UV coordinate on the model surface) and observation angle(s) (e.g., horizontal and vertical angles of observation of the surface point) and as output the light value (which could be greyscale or some color space such as RGB or XYZ). Using the reference local luminance distributions, the neural network may be trained to model the desired function that will achieve the mapping. The number of weights, or nodes, required in the network to obtain a plausible result may be adjusted accordingly and the size of data required for storing these weights will be considerably smaller than the size of data required for storing the full map (i.e., for all surface positions of the 3D model).

If a machine learning model is trained in step 135, it may be trained for a single repeating section and a surface position anywhere on the luminaire may then be mapped to a surface position on the single repeating section in step 107, or it may be trained for all repeating sections of the luminaire. In the latter case, as a result of the training, the machine learning model will learn what the repeating sections are, such that no redundant data is stored.

Optionally, the method may comprise an additional step of determining a material for printing the luminaire and step 135 may comprise pre-rendering the predetermined light values in dependence on this material. Optionally, the method may comprise an additional step of determining one or more positions of the one or more light sources, e.g., if there are multiple light sources or if there is a single light source which is not located in the center of the central axis, and step 135 may comprise pre-rendering the predetermined light values in dependence on these one or more positions.

Steps 103 to 111 are performed after step 139 as described in relation to FIG. 2. However, step 103 is repeated after step 111 has been performed. In the next iteration of step 103, a further camera location and orientation is determined based on further user input. For example, FIG. 5 shows a visual representation of the luminaire 31 of FIGS. 3 and 4 from a second camera location and a second camera orientation at time t2.

In the next iterations of steps 105 and 107, further observation angles are determined on each of the plurality of surface positions of the three-dimensional model based on the further camera location and orientation and a further applicable light value is determined for each of the plurality of surface positions based on the further observation angle determined for the surface position and a light value predetermined either for the surface position or for a corresponding surface position of a different section of the luminaire. At least some of the further applicable light values are determined based on light values predetermined for corresponding surface positions of a different section of the luminaire.

In the next iteration of step 109, a further visual representation of the luminaire is rendered based on the three-dimensional model, the one or more texture maps, the further applicable light values, and the further camera location and orientation. In the next iteration of step 111, the further visual representation is displayed. Steps 103-111 may be repeated multiple times.

In step 109, the three-dimensional model, the one or more texture maps, and the further camera location and orientation may be provided to a renderer, i.e., executable code, which a shader implementation. Only the further applicable light values may be provided to this renderer or the (angle dependent or compressed) lightmap(s) may be provided to this renderer. In the latter case, the renderer determines the further applicable light values.

Figures 7, 8:
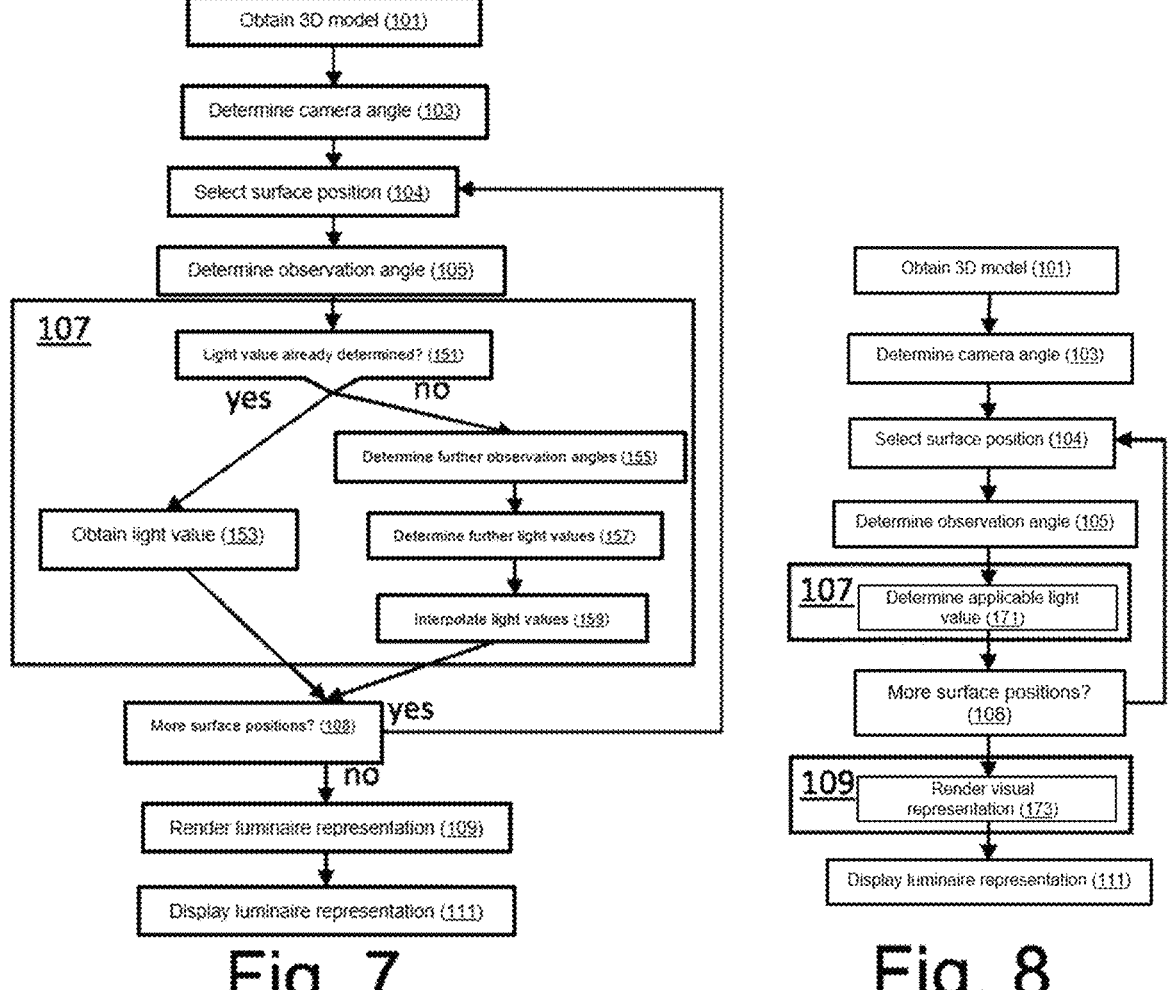
FIG. 7 is a flow diagram of a third embodiment of the method.
FIG. 8 is a flow diagram of a fourth embodiment of the method.

A third embodiment of displaying a visual representation of a luminaire is shown in FIG. 7. This third embodiment is an extension of the first embodiment of FIG. 2. In the embodiment of FIG. 7, light values have been pre-rendered (e.g., as described in relation to FIG. 6), but only for a subset of all possible observation angles to further reduce the quantity of values that need to be stored. Furthermore, step 107 is implemented by steps 151, 153, 155, 157, and 159.

Step 151 is performed after the first or next observation angle has been determined in step 105 on the surface position selected in step 104. Step 151 comprises determining whether a light value has been predetermined for the exact observation angle determined in step 105, e.g., is present in a light map. If so, step 153 is performed. Step 153 comprises obtaining a light value associated with the exact observation angle determined in step 105, either for the surface position selected in step 104 or for a corresponding surface position of a different section of the luminaire. If it is determined in step 151 that no light value has been predetermined for the exact observation angle determined in step 105, step 155 is performed.

Step 155 comprises determining at least two further observation angles surrounding the observation angle determined in step 105. Step 157 comprises determining at least two relevant light values based on the at least two further observation angles determined in step 155 and light values predetermined either for the surface position selected in step 104 or for a corresponding surface position of a different section of the luminaire. Step 159 comprises interpolating between the at least two relevant light values determined in step 157. Step 108 is performed after step 153 or step 159 has been performed and the method then proceeds as shown in FIG. 7 and as described in relation to FIG. 2.

A fourth embodiment of displaying a visual representation of a luminaire is shown in FIG. 8. This fourth embodiment is an extension of the first embodiment of FIG. 2. In the embodiment of FIG. 8, step 107 of FIG. 2 is implemented by a step 171 and step 109 of FIG. 2 is implemented by a step 173. Step 171 comprises determining the applicable light value for the surface position selected in step 104 and including this applicable light value in an applicable light map. This light map may be created in step 171 if it does not already exist. The three-dimensional object may be covered by a single light map or by a plurality of light maps.

Step 173 comprises rendering the visual representation of the luminaire by rendering the visual representation of the luminaire based on the one or more applicable light maps determined/created in step 171 and thereby based on the applicable light values. The light maps described in relation to FIG. 7 are conventional light maps used in the rendering stage, created for a specific camera location and orientation. They are different from the angle-dependent light maps and compressed light maps described in relation to FIG. 6, which are not created for a specific camera location and orientation, but for a plurality of possible observation angles.

Figure 9:
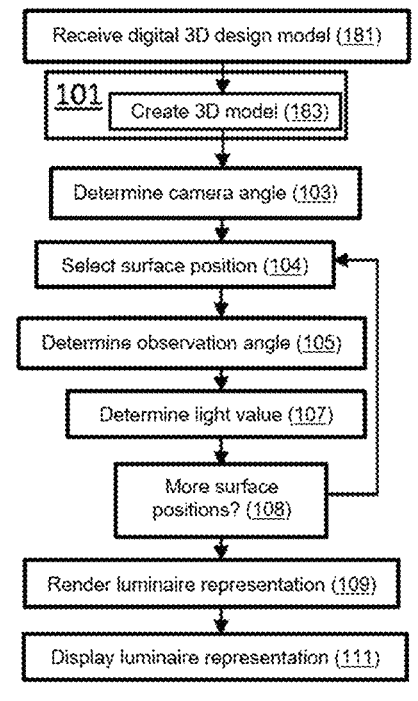
FIG. 9 is a flow diagram of a fifth embodiment of the method.

A fifth embodiment of displaying a visual representation of a luminaire is shown in FIG. 9. This fifth embodiment is an extension of the first embodiment of FIG. 2. In the embodiment of FIG. 9, the three-dimensional model and one or more texture maps are extracted from a digital three-dimensional design model. In the embodiment of FIG. 9, a step 181 is performed before step 101 and step 101 is implemented by a step 183. Step 181 comprises receiving a digital three-dimensional design model of the luminaire, e.g., a fully detailed 3D model of the product. The digital three-dimensional design model comprises texture details of the luminaire. Step 183 comprises creating the three-dimensional (base) model and the one or more texture maps based on the digital three-dimensional design model received in step 181.

Figure 10:
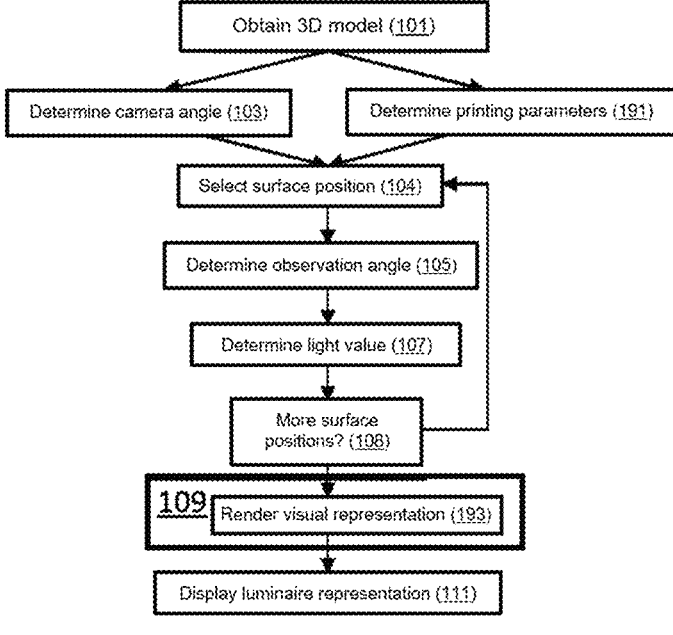
FIG. 10 is a flow diagram of a sixth embodiment of the method.

A sixth embodiment of displaying a visual representation of a luminaire is shown in FIG. 10. This sixth embodiment is an extension of the first embodiment of FIG. 2. In the embodiment of FIG. 10, a step 191 is performed at least partly in parallel with step 103 and step 109 is implemented by a step 193. In an alternative embodiment, step 191 is performed before or after step 103. Step 191 comprises determining user-specified printing parameters for printing the luminaire. Step 193 comprises rendering the visual representation of the printed luminaire further based on the user-specified printing parameters determined in step 191. For example, user-specified parameters may indicate the print layer height and/or width and/or from which material the luminaire will be manufactured.

Multiple of the embodiments of FIGS. 2 and 6 to 10 may be combined. For example, one or more of the embodiments of FIGS. 7 to 10 may be combined with the embodiment of FIG. 6.

Figure 11:
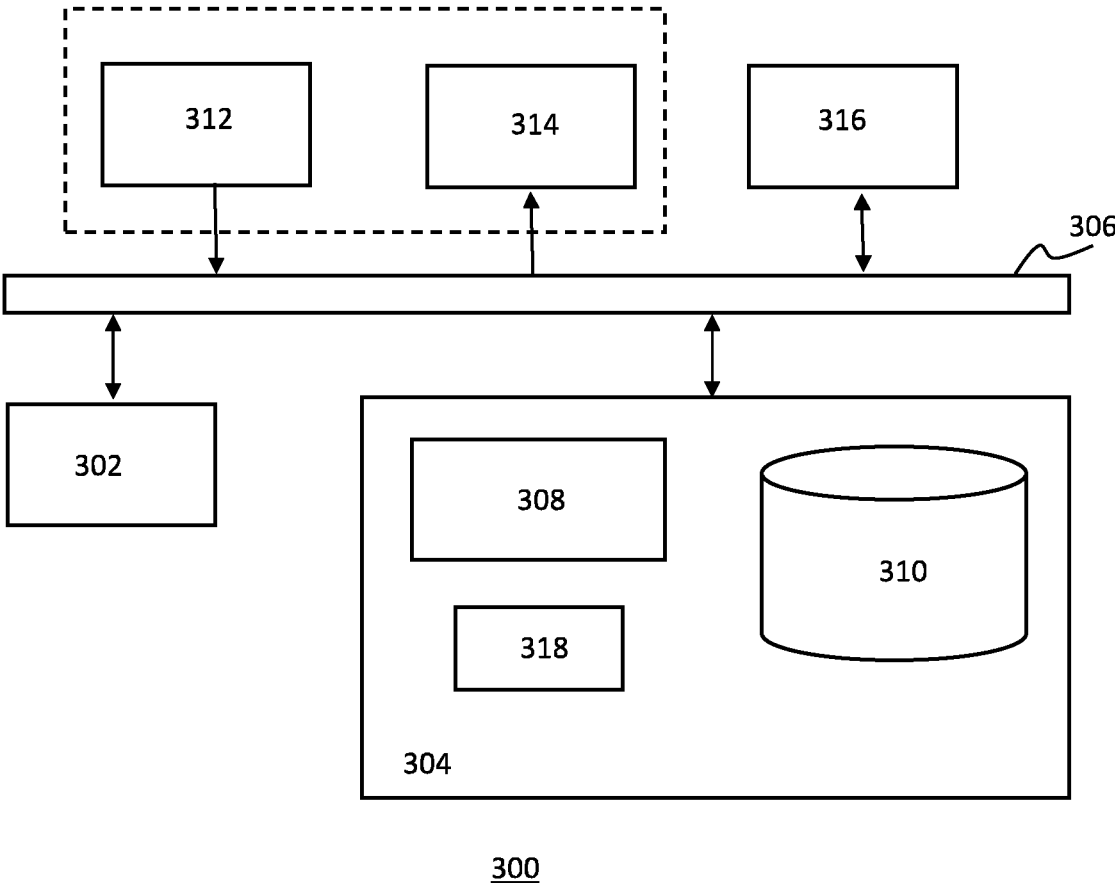
FIG. 11 is a block diagram of an exemplary data processing system for performing the method of the invention.

FIG. 11 depicts a block diagram illustrating an exemplary data processing system that may perform the method as described with reference to FIGS. 2 and 6 to 10.

As shown in FIG. 11, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 11 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display. A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 11, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 11) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

FIG. 11 shows the input device 312 and the output device 314 as being separate from the network adapter 316. However, additionally or alternatively, input may be received via the network adapter 316 and output be transmitted via the network adapter 316. For example, the data processing system 300 may be a cloud server. In this case, the input may be received from and the output may be transmitted to a user device that acts as a terminal. Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for displaying a visual representation of a luminaire, said visual representation including a representation of a light effect generated by one or more activated light sources in or on said luminaire, said system comprising:

at least one output interface; and at least one processor configured to:

obtain a three-dimensional model of said luminaire and one or more texture maps associated with said three-dimensional model, said one or more light sources and said luminaire being rotatably symmetric with respect to a central axis of said luminaire said surface of said luminaire comprising a plurality of repeating sections, determine a camera location and orientation based on user input, determine observation angles on each of a plurality of surface positions of said three-dimensional model based on said camera location and orientation, determine, for each of said plurality of surface positions, an applicable light value for a respective surface position based on said observation angle determined for said surface position and further based on either:

a light value predetermined for said surface position, or a light value for a corresponding surface position of a different section of said luminaire, wherein at least some of said applicable light values being determined based on light values predetermined for corresponding surface positions of a different section of said luminaire, render said visual representation of said luminaire based on said three-dimensional model, said one or more texture maps, said applicable light values, and said camera location and orientation, and display said visual representation via said at least one output interface.

2. A system as claimed in claim 1, wherein said at least one processor is configured to:

determine a first observation angle on a first one of said plurality of surface positions, determine at least two observation angles surrounding said first observation angle, determine at least two relevant light values based on said at least two observation angles and light values predetermined either for said first surface position or for a corresponding surface position of a different section of said luminaire, and determine a first applicable light value for said first surface position by interpolating between said at least two relevant light values.

3. A system as claimed in claim 1, wherein said at least one processor is configured to pre-render said predetermined light values by rendering a light value for each of a plurality of observation angles for each surface position in said three-dimensional model of at least one section of said luminaire.

4. A system as claimed in claim 3, wherein said at least one processor is configured to store said predetermined light values in angle-dependent light maps and determine said applicable light values based on said angle-dependent light maps.

5. A system as claimed in claim 3, wherein said at least one processor is configured to train a machine learning model based on said predetermined light values and determine said applicable light values via said machine learning model.

6. A system as claimed in claim 3 wherein said at least one processor is configured to determine a material for printing said luminaire and pre-render said predetermined light values in dependence on said material.

7. A system as claimed in claim 3 wherein said at least one processor is configured to pre-render said predetermined light values based on said one or more texture maps and/or based on a computer-aided design file.

8. A system as claimed in claim 3, wherein said at least one processor is configured to determine one or more positions of said one or more light sources and pre-render said predetermined light values in dependence on said one or more positions.

9. A system as claimed in claim 1, wherein said at least one processor is configured to:

determine one or more applicable light maps which include said applicable light values, and render said visual representation of said luminaire by rendering said visual representation of said luminaire based on said one or more applicable light maps and thereby based on said applicable light values.

10. A system as claimed in claim 1, wherein said at least one processor is configured to:

determine a further camera location and orientation based on further user input, determine further observation angles on each of said plurality of surface positions of said three-dimensional model based on said further camera location and orientation, determine, for each of said plurality of surface positions, a further applicable light value for a respective surface position based on said further observation angle determined for said surface position and further based on either:

a light value predetermined for said surface position, or a light value predetermined for a corresponding surface position of a different section of said luminaire, at least some of said further applicable light values being determined based on light values predetermined for corresponding surface positions of a different section of said luminaire, render said further visual representation of said luminaire based on said three-dimensional model, said one or more texture maps, said further applicable light values, and said further camera position and orientation, and display said further visual representation via said at least one output interface.

11. A system as claimed in claim 1, wherein said three-dimensional model is a three-dimensional mesh model.

12. A system as claimed in claim 1, wherein said at least one processor is configured to:

receive a digital three-dimensional design model of said luminaire, and obtain said three-dimensional model and said one or more texture maps by creating said three-dimensional model and said one or more texture maps based on said digital three-dimensional design model.

13. A system as claimed in claim 1, wherein said at least one processor is configured to:

determine user-specified printing parameters for printing said luminaire, and render said visual representation of said printed luminaire further based on said user-specified printing parameters.

14. A method of displaying a visual representation of a luminaire, said visual representation including a representation of a light effect generated by one or more activated light sources in or on said luminaire, said method comprising:

obtaining a three-dimensional model of said luminaire and one or more texture maps associated with said three-dimensional model, said one or more light sources and said luminaire being rotatably symmetric with respect to a central axis of said luminaire, said surface of said luminaire comprising a plurality of repeating sections;

determining a camera location and orientation based on user input;

determining observation angles on each of a plurality of surface positions of said three-dimensional model based on said camera location and orientation;

determining, for each of said plurality of surface positions, an applicable light value for a respective surface position based on said observation angle determined for said surface position and further based on either:

a light value predetermined for said surface position, or a light value predetermined for a corresponding surface position of a different section of said luminaire, at least some of said applicable light values being determined based on light values predetermined for corresponding surface positions of a different section of said luminaire;

rendering said visual representation of said luminaire based on said three-dimensional model, said one or more texture maps, said applicable light values, and said camera location and orientation; and displaying said visual representation.

15. A non-transitory computer readable medium comprising computer program code to perform the method of claim 14 when run on a processor.

* * * * *